(12) United States Patent
Suzuki et al.

(10) Patent No.: US 9,559,392 B2
(45) Date of Patent: Jan. 31, 2017

(54) BATTERY PACK

(75) Inventors: Takamasa Suzuki, Toyota (JP); Takashi Murata, Kasugai (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 247 days.

(21) Appl. No.: 14/234,515

(22) PCT Filed: Jul. 26, 2012

(86) PCT No.: PCT/IB2012/001456
§ 371 (c)(1),
(2), (4) Date: Jan. 27, 2014

(87) PCT Pub. No.: WO2013/014529
PCT Pub. Date: Jan. 31, 2013

(65) Prior Publication Data
US 2014/0134470 A1    May 15, 2014

(30) Foreign Application Priority Data

Jul. 28, 2011  (JP) .................................. 2011-165371

(51) Int. Cl.
*H01M 10/6557* (2014.01)
*H01M 6/50* (2006.01)
*H01M 10/615* (2014.01)
*H01M 10/6551* (2014.01)
*H01M 10/6566* (2014.01)
*H01M 10/613* (2014.01)

(52) U.S. Cl.
CPC ....... *H01M 10/5059* (2013.01); *H01M 6/5038* (2013.01); *H01M 10/613* (2015.04); *H01M 10/615* (2015.04); *H01M 10/6551* (2015.04); *H01M 10/6557* (2015.04); *H01M 10/6566* (2015.04)

(58) Field of Classification Search
CPC   H01M 6/5038; H01M 10/613; H01M 10/615; H01M 10/6551; H01M 10/6557; H01M 10/6566
See application file for complete search history.

(56) References Cited

U.S. PATENT DOCUMENTS

| 6,555,264 B1 | 4/2003 | Hamada et al. |
| 2005/0287426 A1 | 12/2005 | Kim et al. |

(Continued)

FOREIGN PATENT DOCUMENTS

| CN | 1189953 | 2/2005 |
| EP | 1 093 170 A1 | 4/2001 |

(Continued)

*Primary Examiner* — Brittany Raymond
(74) *Attorney, Agent, or Firm* — Finnegan, Henderson, Farabow, Garrett & Dunner, LLP

(57) ABSTRACT

A battery pack includes a plurality of battery modules; at least one space that is formed between the battery modules that are adjacent to each other, and that serves as a flow path for a heat carrier; and a plurality of protrusions that protrude toward an inside of the space, and that are arranged on surfaces of opposing surfaces that oppose each other and that define the space. The plurality of protrusions that are arranged on one surface of the opposing surfaces and the plurality of protrusions that are arranged on the other surface of the opposing surfaces are arranged in positions that oppose each other across the space.

4 Claims, 9 Drawing Sheets

EXAMPLE 1

(56) References Cited

U.S. PATENT DOCUMENTS

| | | |
|---|---|---|
| 2006/0063067 A1 | 3/2006 | Kim |
| 2006/0240318 A1 | 10/2006 | Kim et al. |
| 2011/0052960 A1 | 3/2011 | Kwon et al. |
| 2012/0208064 A1 | 8/2012 | Murata et al. |

FOREIGN PATENT DOCUMENTS

| | | | |
|---|---|---|---|
| EP | 1-093170 | * | 4/2001 |
| JP | 2000-90988 | | 3/2000 |
| JP | 2006-12847 | | 1/2006 |
| JP | 2006-93144 | | 4/2006 |
| JP | 2006-310309 | | 11/2006 |
| KR | 10-2011 0024954 | | 3/2011 |
| WO | WO 2012/059951 A1 | | 5/2012 |

* cited by examiner

EXAMPLE 1

EXAMPLE 2

COMPARATIVE EXAMPLE 1

COMPARATIVE EXAMPLE 2

COMPARATIVE EXAMPLE 3

EXAMPLE 1

EXAMPLE 2

COMPARATIVE EXAMPLE 3

BATTERY PACK

CROSS-REFERENCE TO RELATED APPLICATIONS

This application is a national phase application of International Application No. PCT/IB2012/001456, filed Jul. 26, 2012, and claims the priority of Japanese Application No. 2011-165371, filed Jul. 28, 2011, the content of both of which is incorporated herein by reference.

BACKGROUND OF THE INVENTION

1. Field of the Invention

The invention relates to a battery pack that includes a plurality of battery modules.

2. Description of Related Art

In the related art, configuring a battery pack to obtain higher output voltage or the like, for example, by electrically connecting a plurality of battery modules together to form an assembled battery is known. Also, the battery modules that make up the assembled battery may each be formed by one single cell or by a plurality of single cells (that is, the battery modules that make up the assembled battery may each be formed as an assembled battery that is made up of a plurality of single cells).

Such battery packs having a wide variety of structures, from those with a small capacity that are used as power supplies for small electronic devices such as telephones and laptop computers, for example, to those with a large capacity that are used as power supplies for driving apparatuses of hybrid vehicles and electric vehicles and the like, for example, are in wide use.

It is known that it is important to efficiently release heat that is generated in these battery packs during use. In particular, when a secondary battery is used as a single cell that forms a battery pack, it is extremely important that heat be released efficiently when charging and discharging.

Therefore, in this technical field, proposals have been made to increase the heat dissipation efficiency of a secondary battery pack by, for example, providing ribs that extend in the direction in which cooling air flows on the surfaces of cases of the secondary batteries that make up a secondary battery pack so as to form a channel through which cooling air is able to flow between secondary batteries, as described in Japanese Patent Application Publication No. 2006-093144 (JP 2006-093144 A), or providing protrusions on surfaces of a partition wall that is arranged between single cells that make up a secondary battery pack so as to form a flow path through which cooling air is able to flow, between the single cells, as described in Japanese Patent Application Publication No. 2006-012847 (JP 2006-012847 A).

As described above, in this technical field, proposals have been made to increase the heat dissipation efficiency of a secondary battery pack by forming a space for flowing cooling air between single cells, by providing ribs that extend in the direction in which the cooling air flows on the surfaces of the cases of a plurality of single cells that make up a secondary battery pack, or providing protrusions on the surfaces of a partition wall arranged between single cells.

However, simply providing ribs that extend in the direction in which the cooling air flows on the surfaces of the cases of a plurality of single cells that make up a secondary battery pack results in the air only passing monotonically through cooling space, so a sufficient cooling effect is unable to be obtained. Also, when protrusions are provided on the surfaces of a partition wall arranged between single cells, the flow of air inside the cooling space becomes disturbed, which does improve the cooling effect to some degree. However, in large capacity battery packs used as power supplies for the driving apparatuses of hybrid vehicles and electric vehicles and the like, the amount of heat that is released during charging and discharging is large, so an even greater improvement in cooling efficiency is required.

SUMMARY OF THE INVENTION

The invention thus provides a battery pack that includes a plurality of battery modules, that more efficiently regulates the temperature of the battery modules by achieving heat exchange (cooling or heating) with a higher efficiency.

One aspect of the invention relates to a battery pack that includes a plurality of battery modules; at least one space that is formed between the battery modules that are adjacent to each other, and that serves as a flow path through which a heat carrier flows; and a plurality of protrusions that protrude toward an inside of the space, and that are arranged on surfaces of opposing surfaces that oppose each other and that define the space. The plurality of protrusions that are arranged on one surface of the opposing surfaces and the plurality of protrusions that are arranged on the other surface of the opposing surfaces are arranged in positions that oppose each other across the space.

With the battery pack according to this aspect of the invention, in a battery pack that includes a plurality of battery modules, it is possible to achieve a higher heat-transfer efficiency, and thus more efficiently regulate the temperature of the battery modules, by arranging a plurality of protrusions inside of a heat carrier flow path formed between adjacent battery modules, and configuring the shape and arrangement of the protrusions to satisfy specific conditions.

Also, in the battery pack according to this structure, the protrusions may have a longitudinal direction when viewed from a protruding direction of the protrusions.

Also, in the battery pack according to this structure, the longitudinal direction of the protrusions may be inclined with respect to a flow direction of the heat carrier in the space, that is a flow direction that excludes disturbed flow caused by the presence of the protrusions.

Also, in the battery pack according to this structure, the longitudinal direction of the plurality of protrusions that are arranged on one surface of the opposing surfaces may be inclined with respect to the flow direction of the heat carrier in the same direction as a direction in which the longitudinal direction of the plurality of protrusions that are arranged on the other surface of the opposing surfaces is inclined with respect to the flow direction of the heat carrier.

Also, in the battery pack according to the structure described above, the longitudinal direction of the plurality of protrusions that are arranged on one surface of the opposing surfaces may be inclined with respect to the flow direction of the heat carrier in an inverse manner in relation to a direction in which the longitudinal direction of the plurality of protrusions that are arranged on the other surface of the opposing surfaces is inclined with respect to the flow direction of the heat carrier.

Also, in the battery pack according to the structure described above, the space may be divided into a plurality of regions by a dividing member that is arranged between the battery modules that are adjacent to each other.

Also in the battery pack according to this structure, the protrusions may have a longitudinal direction when viewed from the protruding direction of the protrusions, and at least one end portion in the longitudinal direction of the protrusions may be in contact with the dividing member.

Also in the battery pack according to the structure described above, the dividing member may be a rib that protrudes toward the inside of the space, and that is arranged on at least one surface of the opposing surfaces.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1A:
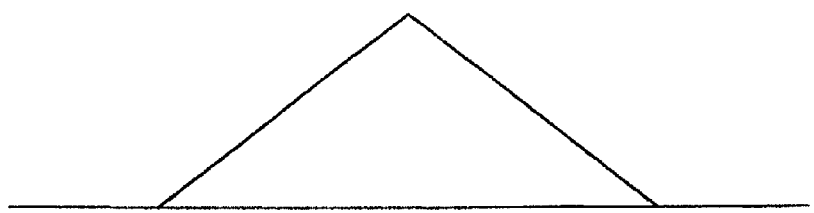
FIGS. 1A to 1C are views showing frame formats of examples of sectional shapes according to a plane orthogonal to the longitudinal direction of protrusions arranged inside of a heat carrier flow path formed between adjacent battery modules, in a battery pack according to one example embodiment of the invention.

As described above, the invention provides a battery pack that includes a plurality of battery modules, that more efficiently regulates the temperature of the battery modules by achieving higher heat-transfer efficiency.

Through intense research, the inventor discovered that in a battery pack that includes a plurality of battery modules, it is possible to achieve higher heat-transfer efficiency, and thus more efficiently regulate the temperature of the battery modules, by arranging a plurality of protrusions inside of a heat carrier flow path formed between adjacent battery modules, and configuring the shape and arrangement of the protrusions to satisfy specific conditions. It is this discovery that led the inventor to conceive this invention.

That is, a battery pack according to a first example embodiment of the invention includes a plurality of battery modules; at least one space that is formed between the battery modules that are adjacent to each other, and that serves as a flow path through which a heat carrier flows; and a plurality of protrusions that protrude toward an inside of the space, and that are arranged on surfaces of opposing surfaces that oppose each other and that define the space. The plurality of protrusions that are arranged on one surface of the opposing surfaces and the plurality of protrusions that are arranged on the other surface of the opposing surfaces are arranged in positions that oppose each other across the space.

As described above, the battery pack according to this example embodiment includes a plurality of battery modules. These battery modules may be electrically connected together in a variety of ways depending on the capacity and voltage that the battery pack according to the example embodiment needs to supply. For example, to obtain higher voltage, the plurality of battery modules may be connected together in series, and to obtain a larger capacity, the plurality of battery modules may be connected together in parallel. Furthermore, the battery pack according to this example embodiment may also include a plurality of battery modules that are connected together in series and a plurality of battery modules that are connected together in parallel.

Also, the battery modules that make up the battery pack according to this example embodiment may be formed from one single cell or a plurality of single cells. That is, each battery module that makes up the battery pack according to this example embodiment may be formed as an assembled battery that is made up of a plurality of single cells.

Moreover, as described above, the invention provides a battery pack that includes a plurality of battery modules, that more efficiently regulates the temperature of the battery modules by achieving higher heat-transfer efficiency. Also, when a secondary battery is used for single cells that make up the battery pack, the amount of heat generated during charging and discharging, for example, will be large, so it is extremely important that the battery be cooled efficiently. Therefore, it is particularly desirable to apply the structure according to the invention to a battery pack that uses a secondary battery for the single cells that make up the battery pack.

Some possible examples of this secondary battery are a lithium-ion secondary battery, a lithium-ion polymer secondary battery, a nickel-metal-hydride secondary battery, and a nickel-cadmium secondary battery and the like. Also, instead of a secondary battery, a capacitor may also be used for single cells that make up the battery pack.

However, in the description above it should not be construed that the object to which the structure according to the invention is applied is limited to a battery pack that uses a secondary battery for single cells that make up the battery pack. That is, the structure according to the invention may also be applied to a battery pack that uses a primary battery for single cells that make up the battery pack.

Some possible examples of this primary battery are a dry battery (such as a manganese dry cell, an alkali-manganese dry cell, an Oxyride dry-cell battery, a nickel dry cell, and a nickel-manganese dry cell and the like), a silver oxide battery, and a lithium battery (such as a manganese lithium dioxide battery, and an iron sulfide lithium battery and the like).

As described above, in the battery pack according to this example embodiment, at least one space that serves as a flow path through which a heat carrier for regulating the temperature of the battery modules flows is formed between adjacent battery modules. This space may be defined by a member (i.e., a peripheral edge member) such as a partition wall (a rib) provided on a peripheral edge portion of the adjacent battery modules, and outer surfaces of adjacent battery modules or the like, for example. Also, the space defined in this way may also be divided into a plurality of regions by another member (a dividing member) provided between the adjacent battery modules, for example. That is, in the battery pack according to this example embodiment, the number, shape, and arrangement of the spaces that serve as the flow path through which the heat carrier flows are not particularly limited as long as the heat carrier is able to flow through the space. Therefore, a wide variety of structures according to the structure of the battery pack are possible.

The material of the member that defines the space that serves as the flow path through which the heat carrier flows is preferably material having good thermal conductivity (for example, metal such as aluminum), from the viewpoint of heat dissipation efficiency. However, resin such as plastic, for example, may also be used. Similarly, the outer surfaces of the battery modules that define the space that serves as the flow path through which the heat carrier flows may also be made of metal such as aluminum, or resin such as plastic, for example. The outer surfaces of the battery modules may also be integrated with the battery modules. Alternatively, a separate member (an exterior member) may be arranged on the outer surfaces of the battery modules, and the exterior member, together with the peripheral edge portion of adjacent battery modules or the dividing member or the peripheral edge member provided between adjacent battery modules, may define the space that serves as the flow path through which the heat carrier flows.

Also, in the battery pack according to the example embodiment, a plurality of protrusions that protrude toward the inside of the at least one space that serves as the flow path that is defined as described above and through which the heat carrier flows are arranged on the surfaces (i.e., opposing surfaces) of the surfaces that oppose each other and that define the space (i.e., defining surfaces).

The opposing surfaces described above refer to any one or a combination of for example, i) outer surfaces that oppose each other across a space that serves as a flow path through which a heat carrier flows, of adjacent battery modules that sandwich the space, ii) surfaces that oppose each other across the space, of exterior members arranged on the outer surfaces, iii) surfaces that oppose each other across a space that serves as a flow path through which a heat carrier flows, of a peripheral edge member provided on a peripheral edge portion of adjacent battery modules that sandwich the space, iv) surfaces that oppose each other across a space that serves as a flow path through which the heat carrier flows, of a dividing member provided between adjacent battery modules that sandwich the space, or v) a set of a surface that faces the inside of the space, of a peripheral edge member provided on a peripheral edge portion of adjacent battery modules that sandwich the space, and a surface that faces the peripheral edge member, of a dividing member that is adjacent to the peripheral edge member (only in a case in which the space is divided).

The heat carrier that regulates the temperature of the battery pack according to this example embodiment may be selected as appropriate from a variety of fluids used as heat carriers in the technical field. Specific examples of the heat carrier may include, for example, air, water, oil (for example, silicone oil or the like), acetone, brine, ammonia, and carbon dioxide. Also, the temperature of the heat carrier may be adjusted to be within an appropriate range before being introduced into the flow path for regulating the temperature of the battery pack according to the example embodiment. Of the various heat carriers, air is preferably used in view of the fact that it is easy to handle and is inexpensive and the like, for example.

As described above, one characteristic of the battery pack according to this example embodiment is that the plurality of protrusions arranged on one surface of the surfaces that oppose each other (i.e., the opposing surfaces) and the plurality of protrusions arranged on the other surface of the opposing surfaces are arranged in positions that oppose each another across the space that serves as the flow path through which the heat carrier flows. In other words, in the battery pack according to this example embodiment, protrusions are also arranged in positions on one surface of the pair of opposing surfaces, that correspond to the positions of the protrusions that are arranged on the other surface of the pair of opposing surfaces. That is, in the battery pack according to this example embodiment, protrusions are arranged in the same positions on the opposing surfaces (i.e., on the pair of surfaces that oppose one another and define the space).

At positions where there are protrusions that oppose each other on the opposing surfaces as described above, the space that serves as the flow path through which the heat carrier for regulating the temperature of the battery pack according to this example embodiment flows is narrower than it is in positions where there are no protrusions. As a result, at positions where there are protrusions that oppose each other on the opposing surfaces, the flowrate of the heat carrier that flows between the opposing protrusions is faster and the heat carrier flows with complex movement such as over and/or around the protrusions, and as a result, the flow of the heat carrier is able to be more effectively disturbed, compared with positions where there are no protrusions. Thus, turbulence in the heat carrier is promoted, so higher heat-transfer efficiency is able to be achieved in the battery pack according to this example embodiment.

In the battery pack according to this example embodiment, protrusions are arranged in the same positions on the opposing surfaces. However, this description does not exclude the presence of regions in portions of the opposing surfaces where there are no protrusions in the same positions on the opposing surfaces due to circumstances such as the design specifications of the battery pack or the battery modules that make up the battery pack, for example.

The frequency and shape of the plurality of protrusions arranged on the opposing surfaces are able to be set appropriately according to various conditions, such as the size (e.g., the sectional area according to a plane orthogonal to the direction in which the heat carrier flows) of the flow path through which the heat carrier flows (i.e., the space that serves as the flow path), and the viscosity and flowrate and the like of the heat carrier. If the frequency of the plurality of protrusions arranged on the opposing surfaces is insufficient, the heat carrier will not easily strike the protrusions when it flows through the flow path, so turbulence in the heat carrier will not easily be generated, which is undesirable. On the other hand, if the frequency of the plurality of protrusions arranged on the opposing surfaces is too high, the heat carrier will strike the protrusions excessively so pressure loss will become too large. Therefore, in order to ensure the flowrate of the heat carrier and maintain the heat-transfer efficiency, the capacity, of means (for example, a blower or the like when the heat carrier is air) for sending the heat carrier into the flow path must be increased, which will lead to an increase in size and cost of the battery pack and is therefore undesirable.

Also, with the height of the plurality of protrusions arranged on the opposing surfaces as well, there is an appropriate range according to various conditions such as the sectional area of the flow path through which the heat carrier flows, and the viscosity and flowrate and the like of the heat carrier. For example, when air is used as the heat carrier, the height of each protrusion (e.g., the dimension of the protrusion in the direction of a normal line of the opposing surfaces on which the protrusions are arranged) is preferably equal to or greater than 11% and less than 44% of the distance between the opposing surfaces, and more preferably equal to or greater than 15% and less than 40% of the distance between the opposing surfaces. If the height of the protrusions is less than 11%, the air that is the heat carrier will not easily strike the protrusions when the air flows through the flow path and the effect of increasing in the flowrate of the air that flows between opposing protrusions will also be lessened, and as a result, turbulence in the air will not easily be generated, which makes it difficult to achieve sufficient heat-transfer efficiency and is thus undesirable. On the other hand, if the height of the protrusions is equal to or greater than 44%, the air will strike the protrusions excessively and the space between opposing protrusions will become too narrow, and as a result, pressure loss will become too large. Therefore, in order to ensure the flowrate of the heat carrier and maintain the heat-transfer efficiency, the capacity of equipment (a blower or a fan, for example) for sending the heat carrier into the flow path must be increased, which is undesirable.

Moreover, the protrusions arranged on the opposing surfaces may be contacting a surface other than the surfaces on which the protrusions are arranged (i.e., the opposing surfaces), among the surfaces that define the at least one space that serves as a flow path through which the heat carrier flows (i.e., the defining surfaces). For example, one or more portions of a side surface of the protrusions arranged on the opposing surfaces may be contacting peripheral edge members provided on peripheral edge portions of adjacent battery modules, and/or a dividing member that divides the space formed between adjacent battery modules into a plurality of regions. Conversely, the protrusions arranged on the opposing surfaces may not be contacting a surface other than the surfaces on which the protrusions are arranged (i.e., the opposing surfaces), among the surfaces that define the at least one space that serves as a flow path through which the heat carrier flows (i.e., the defining surfaces).

In the battery pack according to the example embodiment, as described above, when a heat carrier for regulating the temperature of the battery modules flows through the flow path, the heat carrier strikes these protrusions, creating turbulence, and the heat carrier flows through the relatively narrow space between protrusions arranged facing one another on the opposing surfaces across the space that serves as the flow path for the heat carrier, such that the flowrate of the heat carrier increases locally. As a result, heat-transfer efficiency according to the heat carrier is improved. The shape of the protrusions arranged on the opposing surfaces in the space that serves as the flow path for the heat carrier is not particularly limited. For example, protrusions having various shapes, such as semispherical, conically-shaped, circular columnar-shaped, pyramid-shaped, or prismatic columnar-shaped protrusions may be arranged.

Through intense study, the inventor discovered that it is desirable that the dimension of the protrusions when viewed from the protruding direction differ depending on the direction, in order to further increase the aforementioned action of the protrusions arranged on the opposing surfaces in the space that serves as the flow path for the heat carrier. Here, the phrase "the protrusions have a longitudinal direction when viewed from the protruding direction of the protrusions" refers to the protrusions on the opposing surfaces having a longitudinal direction, i.e., having a long shape (e.g., rectangular, rhomboid, parallelogram, triangular, or oblong or the like) in a specified direction.

As described above, the protrusions arranged on the opposing surfaces in the space that serves as the flow path for the heat carrier have a longitudinal direction when viewed from the protruding direction of the protrusions. Therefore, the contact area between the protrusions and the heat carrier that flows through the space that serves as the flow path increases. In addition, the region where the space that serves as the flow path through which the heat carrier flows is narrow increases. As a result, turbulence in the heat carrier is able to be more actively created.

Therefore, a battery pack according to a second example embodiment of the invention is the battery pack according to the first example embodiment of the invention, in which the protrusions have a longitudinal direction when viewed from a protruding direction of the protrusions.

In the battery pack according to this example embodiment, as described above, the protrusions that are arranged on the opposing surfaces in the space that serves as the flow path for the heat carrier have a longitudinal direction when viewed from the protruding direction of the protrusions. Accordingly, the contact area between the protrusions and the heat carrier that flows through the space that serves as the flow path increases. In addition, the region where the space that serves as the flow path through which the heat carrier flows is narrow increases, and the region where the flowrate of the heat carrier that flows through the space that serves as the flow path changes also increases. As a result, turbulence in the heat carrier is able to be more actively created, so higher heat-transfer efficiency can be achieved.

As described above, in the battery pack according to this example embodiment, the protrusions arranged on the opposing surfaces in the space that serves as the flow path for the heat carrier have a longitudinal direction when viewed from the protruding direction of the protrusions. That is, the protrusions in the battery pack according to this example embodiment have a longitudinal direction on the opposing surfaces. More specifically, opposing surfaces of the protrusions in the battery pack according to this example embodiment have a long shape (e.g., rectangular, rhomboid, parallelogram, triangular, or oblong or the like) in a specified direction.

That is, the protrusions in the battery pack according to this example embodiment may also have shapes arranged on the opposing surfaces, with a surface of a prismatic column such as a triangular column or a square column as a bottom surface, for example. Also, the protrusions in the battery pack according to this example embodiment may have shapes arranged on the opposing surfaces, with a divided surface of a circular column that has been divided into two by a plane that includes a line (a central axis) that connects the center of a top surface with the center of a bottom surface, for example, as the bottom surface. Furthermore, the protrusions in the battery pack according to this example embodiment may have shapes arranged on the opposing surfaces, with a divided surface of a spheroid that has been divided into two by a plane that includes a rotational axis of the spheroid, for example, as the bottom surface.

Figure 1B:
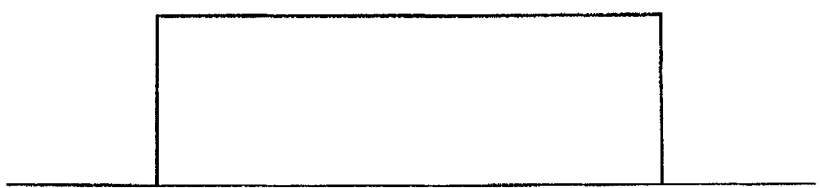
Figure 1C:
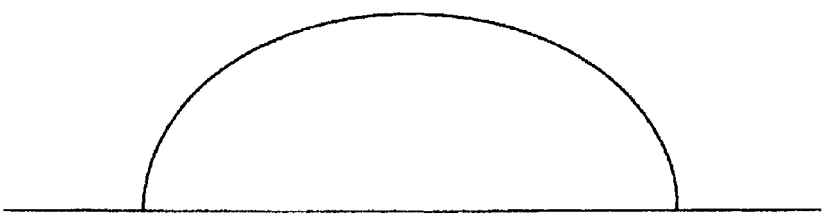

Therefore, the shape of a cross-section of the protrusions in the battery pack of this example embodiment, according to a plane orthogonal to the longitudinal direction of the protrusions, may be any of various shapes, such as a triangle as shown in FIG. 1A, a quadrangle as shown in FIG. 1B, or a semicircle as shown in FIG. 1C.

When the protrusions that are arranged on the opposing surfaces in the space that serves as a flow path for the heat carrier has a longitudinal direction when viewed from the protruding direction of the protrusions, the protrusions may be arranged on the opposing surfaces such that the longitudinal direction of the protrusions is orthogonal to the direction in which the heat carrier flows in the space that serves as the flow path for the heat carrier. In this case, the contact area where the heat carrier that flows through the space that serves as the flow path strikes the protrusions becomes significantly larger, and the region where the space that serves as the flow path through which the heat carrier flows is narrow also drastically increases, so turbulence in the heat carrier can be even more actively created.

On the other hand, when the protrusions have a longitudinal direction when viewed from the longitudinal direction of the protrusions, the protrusions may be arranged on the opposing surfaces such that the longitudinal direction of the protrusions is parallel to the direction in which the heat carrier flows in the space that serves as the flow path for the heat carrier. In this case, the heat carrier will flow in the longitudinal direction of the protrusions. Therefore, compared with when the longitudinal direction of the protrusions is orthogonal to the direction in which the heat carrier flows, the effect of the flowrate of the heat carrier locally increasing due to the space that serves as the flow path through which the heat carrier flows being narrower is lessened, but the contact area between the protrusions and the heat carrier when the heat carrier flows through the space that serves as the flow path is able to be increased, while suppressing an increase in pressure loss.

Moreover, when the protrusions have a longitudinal direction when viewed from the longitudinal direction of the protrusions, the protrusions may be arranged on the opposing surfaces such that the longitudinal direction of the protrusions is inclined with respect to the direction in which heat carrier flows in the space that serves as the flow path for the heat carrier. In this case, the heat carrier will flow in the longitudinal direction of the protrusions locally. As a result, turbulence in the heat carrier can be even more actively created.

Therefore, a battery pack according to a third example embodiment of the invention is the battery pack according to the second example embodiment of the invention, in which the longitudinal direction of the protrusions is inclined with respect to a flow direction of the heat carrier in the space, that is a flow direction that excludes disturbed flow caused by the presence of the protrusions.

In the description above, the phrase "disturbed flow caused by the presence of the protrusions" refers to localized movement of the heat carrier near the protrusions that is caused by the presence of the protrusions on the opposing surfaces in the space that serves as the flow path through which the heat carrier flows (for example, movement of the heat carrier over and/or around the protrusions, as well as movement of the heat carrier along the surface of the protrusions, and the like). Therefore, the phrase "a direction in which the heat carrier flows in the space, that is a flow direction that excludes disturbed flow caused by the presence of the protrusions" in other words refers to the direction in which the heat carrier flows when there are no protrusions on the opposing surfaces in the space that serves as the flow path through which the heat carrier flows.

In the battery pack according to this example embodiment, as described above, protrusions are arranged on the opposing surfaces such that the longitudinal direction of the protrusions are inclined with respect to the direction in which the heat carrier flows in the space that serves as the flow path for the heat carrier. Accordingly, in addition to the flowrate of the heat carrier that flows between opposing protrusions increasing and the heat carrier flowing with complex movement such as over and/or around the protrusions, that can be expected with the battery modules according to the example embodiments described above, in the battery pack according to this example embodiment, the heat carrier also moves in the longitudinal direction of the protrusions. As a result, in the battery pack according to this example embodiment, turbulence in the heat carrier is able to be even more actively created, so an even higher heat-transfer efficiency is able to be achieved.

The angle of the inclination of the longitudinal direction of the protrusions on the opposing surfaces with respect to the flow direction of the heat carrier (i.e., the flow direction that excludes disturbed flow caused by the presence of the protrusions) may be set appropriately according to various conditions, such as the size (e.g., the sectional area according to a plane orthogonal to the direction in which the heat carrier flows) of the flow path through which the heat carrier flows (i.e., the space that serves as the flow path), and the viscosity and flowrate and the like of the heat carrier. As the inclination angle becomes smaller (i.e., as the longitudinal direction of the protrusions on the opposing surfaces and the flow direction of the heat carrier get closer to being parallel to each other), the movement in the longitudinal direction of the protrusions as described above is not as easily added to the flow of the heat carrier, so the action of creating turbulence in the heat carrier decreases. On the other hand, as the inclination angle becomes larger (i.e., as the longitudinal direction of the protrusions on the opposing surfaces and the flow direction of the heat carrier get closer to being perpendicular to each other), the degree to which the heat carrier strikes the protrusions increases.

Also, the direction of inclination of the longitudinal direction of the protrusions on the opposing surfaces with respect to the flow direction of the heat carrier may be the same with all of the protrusions arranged on both surfaces of the opposing surfaces, or it may be different for the protrusions arranged on one surface of the opposing surfaces than it is for the protrusions arranged on the other surface of the opposing surfaces, or it may be different for each protrusion. In other words, the direction of the movement (in the longitudinal direction of the protrusions on the opposing surfaces) that is added to the flow of the heat carrier by the plurality of protrusions arranged on the opposing surfaces may be the same with all of the protrusions arranged on the opposing surfaces, or it may be different for the protrusions arranged on one surface of the opposing surfaces than it is for the protrusions arranged on the other surface of the opposing surfaces, or it may be different for each protrusion.

The inventor discovered through intense study that when the direction of inclination of the longitudinal direction of the protrusions on the opposing surfaces with respect to the flow direction of the heat carrier (the flow direction that excludes disturbed flow caused by the presence of the protrusions) is the same with all of the protrusions arranged on both surfaces of the opposing surfaces, heat exchange at an extremely high efficiency is able to be realized.

That is, a battery pack according to a fourth example embodiment of the invention is the battery pack according to the third example embodiment of the invention, in which the longitudinal direction of the plurality of protrusions that are arranged on one surface of the opposing surfaces is inclined with respect to the flow direction of the heat carrier (i.e., a flow direction that excludes disturbed flow caused by the presence of the protrusions) in the same direction as a direction in which the longitudinal direction of the plurality of protrusions that are arranged on the other surface of the opposing surfaces is inclined with respect to the flow direction of the heat carrier.

In the battery pack according to this example embodiment, as described above, the direction of inclination of the longitudinal direction of the protrusions on the opposing surfaces with respect to the flow direction of the heat carrier is the same for all of the protrusions arranged on both surfaces of the opposing surfaces. Therefore, the movement of the heat carrier in the longitudinal direction of the protrusions as well is even more strongly added. As a result, in the battery pack according to this example embodiment, disturbance in the flow of the heat carrier is able to be made even more significant, so extremely high heat-transfer efficiency is able to be achieved.

However, as described above, when the direction of inclination of the longitudinal direction of the protrusions on the opposing surfaces with respect to the flow direction of the heat carrier is the same for all of the protrusions arranged on both surfaces of the opposing surfaces, in the battery pack according to this example embodiment, the plurality of protrusions that are arranged on one surface of the opposing surfaces and the plurality of protrusions that are arranged on the other surface of the opposing surfaces are arranged inclined in the same direction in positions that oppose each other across the space that serves as the flow path for the heat carrier. Therefore, the region where the space that serves as the flow path through which the heat carrier flows is narrow increases significantly, and as a result, pressure loss may increase.

In this case as well, in order to ensure the flowrate of the heat carrier and maintain heat-transfer efficiency, the capacity of means (for example, a blower or the like when the heat carrier is air) for sending the heat carrier into the flow path must be increased, as described above. Therefore, the inventor has intensively conducted research to achieve less pressure loss while maintaining heat-transfer efficiency equivalent to that of the battery pack according to the example embodiments described above. As a result, the inventor discovered that it is possible to realize heat exchange at an extremely high efficiency while suppressing an increase in pressure loss, when the direction of inclination of the longitudinal direction of the protrusions on the opposing surfaces with respect to the flow direction of the heat carrier is opposite for the protrusions that are arranged on one surface of the opposing surfaces with respect to the protrusions that are arranged on the other surface of the opposing surfaces.

That is, a battery pack according to a fifth example embodiment of the invention is the battery pack according to the third example embodiment of the invention, in which the longitudinal direction of the plurality of protrusions that are arranged on one surface of the opposing surfaces is inclined with respect to the flow direction of the heat carrier (i.e., a flow direction that excludes disturbed flow caused by the presence of the protrusions) in an inverse manner (in opposite directions) in relation to a direction in which the longitudinal direction of the plurality of protrusions that are arranged on the other surface of the opposing surfaces is inclined with respect to the flow direction of the heat carrier.

In the battery pack according to this example embodiment, as described above, the direction of inclination of the longitudinal direction of the protrusions on the opposing surfaces with respect to the flow direction of the heat carrier is the opposite with the protrusions arranged on one surface of the opposing surfaces than it is with the protrusions arranged on the other surface of the opposing surfaces. Therefore, the movement of the heat carrier in the longitudinal direction of the protrusions is applied in the reverse direction with the protrusions that are arranged on one surface of the opposing surfaces than it is with the protrusions that are arranged on the other surface of the opposing surfaces. As a result, in the battery pack according to this example embodiment, a twist is able to be applied to the flow of the heat carrier.

Meanwhile, in the battery pack according to this example embodiment, the plurality of protrusions that are arranged on one surface of the opposing surfaces and the plurality of protrusions that are arranged on the other surface of the opposing surfaces are arranged inclined in opposite directions at positions that oppose each other across the space that serves as the flow path for the heat carrier. Therefore, the region where the space that serves as the flow path through which the heat carrier flows is narrow is smaller than it is when the protrusions that are arranged on both surfaces of the opposing surfaces are inclined in the same direction. As a result, pressure loss is also able to be further reduced.

In the battery pack in which a plurality of battery modules are electrically connected together, it may be desirable to divide the space formed between the battery modules into a plurality of regions by arranging another member in the space, in order to improve the mechanical strength between the plurality of modules that form up the battery pack, or improve the heat-transfer efficiency between the heat carrier that flows through the space formed between the modules and the battery modules or the like, for example.

Therefore, in the battery pack according to the invention, the space that serves as the flow path through which a heat carrier for regulating the temperature of the battery modules flows may be divided into a plurality of regions by another member (i.e., a dividing member) provided between adjacent battery modules, for example, as described in the beginning. That is, in the battery pack in the invention, the number, shape, and arrangement of the spaces that serve as the flow path through which the heat carrier flows are not particularly limited as long as the heat carrier is able to flow through the space. Therefore, a wide variety of structures according to the structure of the battery pack are possible.

Therefore, a sixth example embodiment of the invention relates to the battery pack according to any one of the first example embodiment of the invention to the fifth example embodiment of the invention, in which the space is divided into a plurality of regions by a dividing member arranged between the battery modules that are adjacent to each other.

In the battery pack according to this example embodiment, the space that serves as the flow path through which the heat carrier flows is divided into a plurality of regions, as described above. Therefore, in the battery pack according to this example embodiment, the protrusions described above are arranged on any one or a combination of, for example, i) outer surfaces that oppose each other across a space that serves as a flow path through which a heat carrier flows, of adjacent battery modules that sandwich the space, ii) surfaces that oppose each other across the space, of exterior members arranged on the outer surfaces, iii) surfaces that oppose each other across a space that serves as a flow path through which a heat carrier flows, of a peripheral edge member provided on a peripheral edge portion of adjacent battery modules that sandwich the space, iv) surfaces that oppose each other across a space that serves as a flow path through which the heat carrier flows, of a dividing member provided between adjacent battery modules that sandwich the space, or v) a set of a surface that faces the inside of the space, of a peripheral edge member provided on a peripheral edge portion of adjacent battery modules that sandwich the space, and a surface that faces the peripheral edge member, of a dividing member that is adjacent to the peripheral edge member (only in a case in which the space is divided).

Also, as described above, the protrusions arranged on the opposing surfaces may be contacting a surface other than the surfaces on which the protrusions are arranged (i.e., opposing surfaces), from among the surfaces that define at least one space that serves as the flow path through which the heat carrier flows (i.e., defining surfaces). For example, when a plurality of protrusions are arranged on opposing surfaces that are different from adjacent dividing members, in a space that is defined by the dividing member and serves as a single flow path for the heat carrier, for example, one or more portions of a side surface of the protrusions arranged on the opposing surfaces may be contacting the dividing member.

More specifically, when a plurality of protrusions are arranged on opposing surfaces that are different from adjacent dividing members, in a space that is defined by adjacent dividing members and serves as a single flow path for the heat carrier, for example, one or both end portions in the longitudinal direction of the protrusions arranged on the opposing surfaces may be contacting the dividing members. In other words, the dimension (i.e., the width), in a direction orthogonal to the flow direction of the heat carrier (i.e., which is often equivalent to the longitudinal direction of the flow path), of the protrusions that are arranged on opposing surfaces that oppose one another across a flow path through which the heat carrier flows, from among surfaces that define the flow path, may be equivalent to the width of the opposing surfaces that is defined by the opposing surfaces and the adjacent defining surfaces.

When both end portions in the longitudinal direction of the protrusions are contacting the dividing members as described above, the width of the individual protrusions spans the entire width of the flow path, so the heat carrier that flows through the flow path is unable to go around the individual protrusions and therefore must always go over them. Thus, it is thought that turbulence in the heat carrier is able to be more effectively created. However, this kind of structure is not necessarily a structural requirement. The protrusions arranged on the opposing surfaces may also not be contacting a surface other than the surfaces on which the protrusions are arranged (i.e., the opposing surfaces), from among the surfaces that define at least one space that serves as the flow path through which the heat carrier flows (i.e., the defining surfaces).

For the material of the members for demarcating (i.e., dividing) the space that serves as the flow path through which the heat carrier flows into a plurality of regions (i.e., the dividing members), material having high thermal conductivity (for example, a metal such as aluminum) is desirable from the viewpoint of heat dissipation efficiency, but resin such as plastic, for example, may also be used.

As described above, according to the battery pack of the invention, in a battery pack that includes a plurality of battery modules, higher heat-transfer efficiency may be achieved, which enables the temperature of the battery modules to be more efficiently regulated, by arranging a plurality of protrusions on the inside of the heat carrier flow path that is formed between adjacent battery modules, and configuring the shape and arrangement of the protrusions to satisfy specific conditions.

Hereinafter, the battery pack according to the example embodiments of the invention will be described with reference to the accompanying drawings. It should be noted that the description below is only intended to illustrate an example. The scope of the invention should not be construed as being limited to the description below.

Example Embodiments

1. Battery Pack Structure

Figure 2:
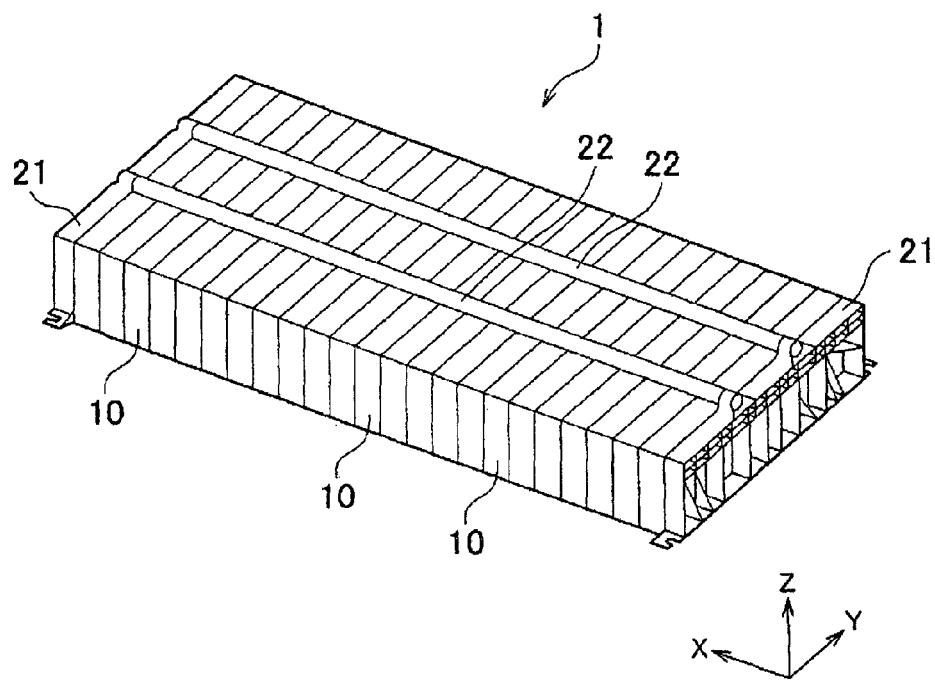
FIG. 2 is a view showing a frame format of the exterior of the battery pack according to the example embodiment of the invention.

FIG. 2 is a view showing a frame format of the exterior of a battery pack according to one example embodiment of the invention. In FIG. 2, the X-axis, the Y-axis, and the Z-axis are all axes that are orthogonal to each other. In the battery pack 1 shown in FIG. 2, a plurality of battery modules 10 having a principal plane on the Y-Z plane are arranged lined up in the X-axis direction. A pair of end plates 21 are arranged one on each end of the battery pack 1 in the X-axis direction. A restraint rod (that corresponds to a connecting member) 22 that extends in the X-axis direction is connected to the pair of end plates 21. Restraint force is able to be applied to the plurality of battery modules 10 by fixing both ends of the restraint rod 22 to the pair of end plates 21. Restraint force is the force that squeezes the battery modules 10 together in the X-axis direction. In this example embodiment, two restraint rods 22 are arranged on an upper surface of the battery pack 1, as shown in FIG. 2, and two more restraint rods 22 are arranged on a lower surface of the battery pack 1 (not shown in FIG. 2).

The number and sectional shape of the restraint rods 22 is not particularly limited, and may be set as appropriate according to the design specifications of the battery pack 1 and the like. The sectional shape of the restraint rods 22 is the shape of a cross-section that is orthogonal to the longitudinal direction of the restraint rods 22. The restraint rods 22 only need to exert restraint force on the plurality of battery modules 10 by being connected to the pair of end plates 21. Also, the mechanism for bundling and integrating the plurality of battery modules 10 together as the battery pack 1 is not limited to the pair of end plates 21 and the restraint rods 22 as shown in FIG. 2, but may be selected as appropriate from various mechanisms known in the technical field. Furthermore, a mechanism for bundling and integrating the plurality of battery modules 10 together as the battery pack 1 is not absolutely necessary. That is, a mode in which this mechanism is absent is also conceivable depending on the environment in which the battery pack 1 is used.

2. Battery Module Structure

Next, the battery modules 10 that make up the battery pack 1 will be described with reference to FIG. 3. As described above, FIG. 3 is a view showing a frame format of battery modules that make up the battery pack shown in FIG. 2. More specifically, FIG. 3 is a view showing a frame format of one of the plurality of battery modules 10 that make up the battery pack 1 shown in FIG. 2.

Figure 3:
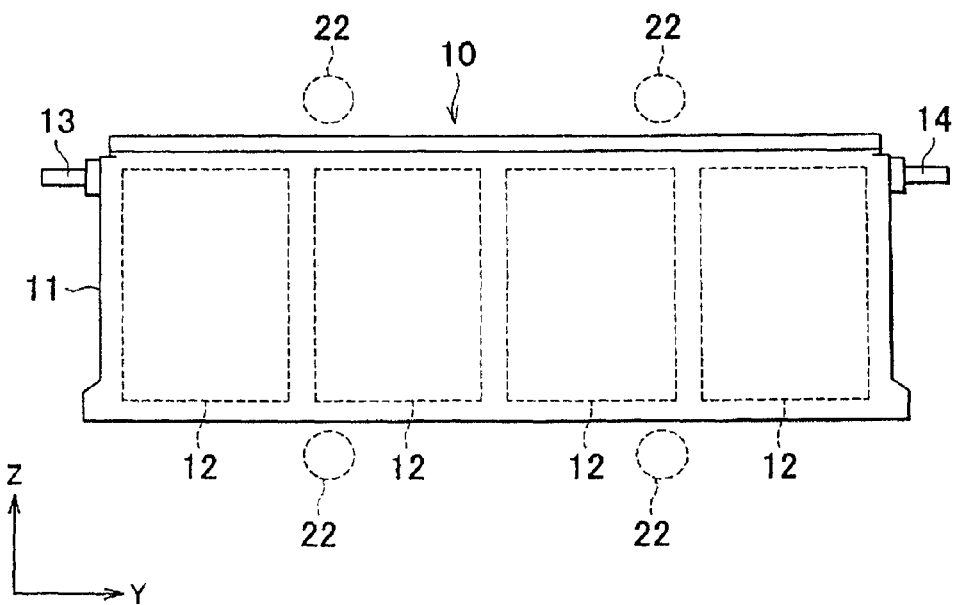
FIG. 3 is a view showing a frame format of the battery modules that form the battery pack shown in FIG. 2.

In this example embodiment, one battery module 10 includes a module case 11 and four single cells 12 housed in the module case 11, as shown in FIG. 3. The four single cells 12 housed in the module case 11 are electrically connected together in series. The module case 11 may be made of resin, for example. A secondary battery such as a nickel-metal-hydride battery or a lithium-ion battery, for example, may be used for the single cells 12. Also, instead of a secondary battery, an electric double layer capacitor may be used.

The number of single cells 12 housed in the module case 11 is not limited to four. That is, the necessary number of single cells 12 may be housed as appropriate. Also, as described above, in this example embodiment, the four single cells 12 housed in the module case 11 are electrically connected together in series, but another connection method may also be employed depending on the capacity and voltage to be supplied by the battery pack 1. For example, when a higher voltage is to be obtained, the plurality of single cells 12 may be connected together in series, and when a larger capacity is to be obtained, the plurality of single cells 12 may be connected together in parallel. Moreover, one battery module 10 may also be formed by one single cell.

In the battery module 10 shown in FIG. 3, a positive terminal 13 and a negative terminal 14, are provided one on one side and one on the other side in the Y-axis direction of the module case 11. The positive terminal 13 is connected to a positive electrode of a single cell 12 housed in the module case 11, and the negative terminal 14 is connected to a negative electrode of a single cell 12 housed in the module case 11. The battery module 10 is charged and discharged via the positive terminal 13 and the negative terminal 14.

Also, the plurality of battery modules 10 that make up the battery pack 1 may be electrically connected together via the positive terminals 13 and the negative terminals 14. For example, with two battery modules 10 that are adjacent in the X-axis direction, the positive terminal 13 of one battery module 10 may be electrically connected to the negative terminal 14 of the other battery module 10 via a conductive member such as a bus bar.

In this example embodiment, the plurality of battery modules 10 arranged lined up in the X-axis direction are electrically connected together in series by a bus bar, not shown. However, although all of the battery modules 10 are electrically connected together in series in this example embodiment, the connection method of the plurality of battery modules 10 is not limited to this. More specifically, a plurality of battery modules 10 that are electrically connected in parallel may also be included in the battery pack 1.

As described above, in the battery pack 1 shown in FIG. 2, the plurality of battery modules 10 that have principal planes on the Y-Z plane are arranged lined up in the X-axis direction. In this example embodiment, the temperature of the battery modules 10 may be regulated by flowing a heat carrier (such as air, for example) that performs heat exchange with the battery modules 10, between the plurality of battery modules 10 arranged lined up in the X-axis direction. In this case, the heat carrier (such as air, for example) that performs heat exchanged with the battery modules 10 is able to flow by interposing a spacer or the like inside of which a space that serves as a flow path for the heat carrier is formed, for example, between adjacent battery modules 10.

However, in this example embodiment, a plurality of members (e.g., dividing members such as ribs) that extend in the direction in which the heat carrier flows (i.e., the Z-axis direction in this example embodiment) are provided on the principal plane (that is parallel to the Y-Z plane) of each battery module 10, and these plurality of battery modules 10 are arranged lined up in the X-axis direction such that the principal planes oppose each other. As a result, these members that are provided on the principal planes of adjacent battery modules 10 contact each other, thereby establishing a predetermined distance between the principal planes of the adjacent battery modules 10, and dividing the space that is thus formed into a plurality of flow paths that extend in the Z-axis direction. This structure will be described below with reference to FIG. 4.

3. Structure of the Heat Carrier Flow Path

Figure 4:
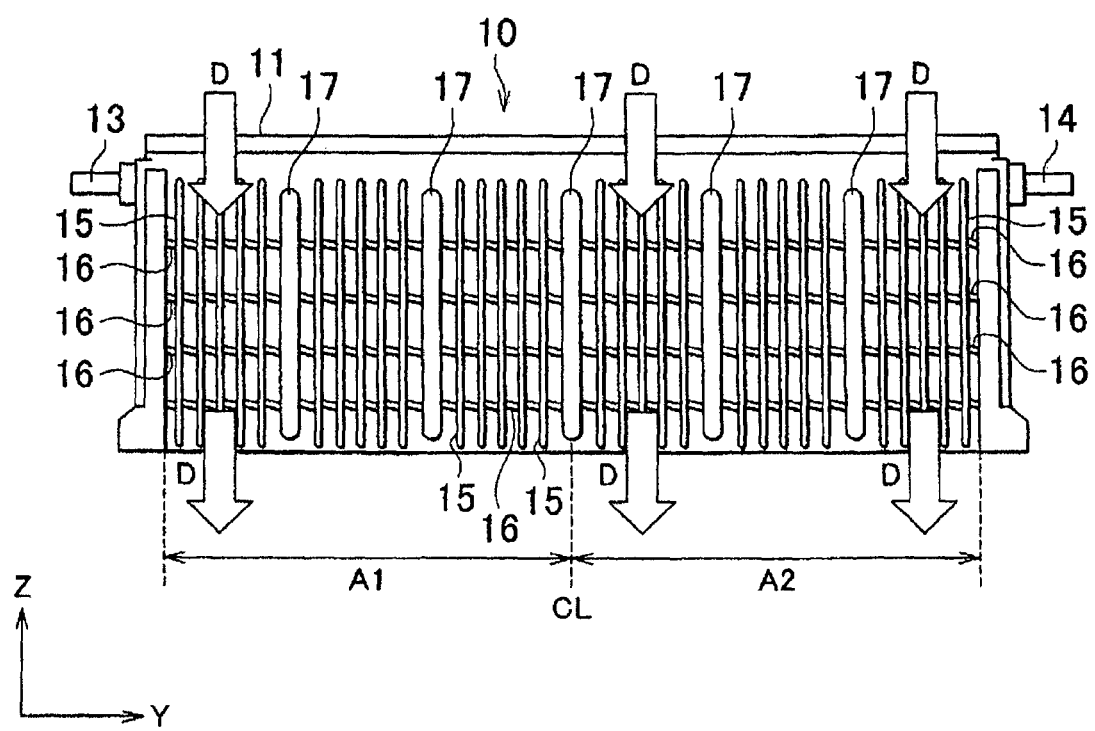
FIG. 4 is a view showing a frame format of the structure of the heat carrier flow path divided into a plurality of regions by a plurality of ribs arranged on a principal plane of the battery module shown in FIG. 3.

FIG. 4 is a view of a frame format showing a heat carrier flow path divided into a plurality of regions by a plurality of ribs arranged on the principal plane of the battery module 10 shown in FIG. 3. As shown in FIG. 4, first ribs 15, protrusions 16, and second ribs 2 are formed on the principal plane (that is parallel to the Y-Z plane) of the battery module 10. The principal plane on which the first ribs 15, the protrusions 16, and the second ribs 17 are formed is a surface that opposes the principal plane of another battery module 10 that is adjacent. The first ribs 15 protrude in the X-axis direction from an outer surface of the module case 11, and extend in the Z-axis direction. A plurality of the first ribs 15 are arranged lined up in the Y-axis direction.

In FIG. 4, although only the principal plane of one battery module of the adjacent battery modules 10 is shown, the principal planes of the other battery modules 10 have the same structure. Therefore, when two adjacent battery modules 10 are lined up in the X-axis direction such that their principal planes oppose each other, the first ribs 15 of the battery modules 10 contact each other. More specifically, tip ends of the first ribs 15 in the X-axis direction contact each other. As described above, restraint force is applied to the battery modules 10, so the first ribs 15 that oppose each other in the X-axis direction are in tight contact with each other. As a result, a plurality of spaces created surrounded by two pair of first ribs 15 that are adjacent in the Y-axis direction and oppose each other in the X-axis direction, and the principal planes of a pair of battery modules 10 that are adjacent in the X-axis direction.

The thus formed spaces serve as flow paths through which a heat carrier (such as air, for example) for regulating the temperature of the battery modules 10 flows. In this example embodiment, air is used as the heat carrier. The spaces extend in the Z-axis direction, so the air flowing in the spaces flows in the Z-axis direction. In FIG. 4, the flow of this air is indicated by arrows, but the direction in which the heat carrier flows may also be a direction opposite that indicated by the arrows shown in FIG. 4.

As described above, the first ribs 15 form flow paths through which the air for regulating the temperature flows. Moreover, in this example embodiment, the second ribs 17 are also arranged, in addition to the first ribs 15, on the principal plane (that is parallel to the Y-Z plane) of the battery module 10, as shown in FIG. 4. The second ribs 17 also protrude in the X-axis direction from the outer surface of the module case 11, and extend in the Z-axis direction. That is, the second ribs 17 have a function similar to that of the first ribs 15. In addition, the width of the second ribs 17 in the Y-axis direction is wider than the width of the first ribs 15 in the Y-axis direction. As a result, the second ribs 17 are able to contribute more than the first ribs 15 are to improving the mechanical strength between the plurality of battery modules 10 that make up the battery pack 1, for example. The shape and material and the like of the second ribs 17 may be set as appropriate according to the mechanical strength required between the battery modules 10. Also, naturally, if the second ribs 17 are not necessary, such as when sufficient mechanical strength can be achieved between the battery modules 10 with only the first ribs 15, for example, the second ribs 17 may be omitted. Further, in FIG. 4, the first ribs 15 and the second ribs 17 are arranged at equally-spaced intervals in the Y-axis direction. However, the first ribs 15 and the second ribs 17 may also not be arranged at equally-spaced intervals in the Y-axis direction.

When the battery module 10 generates heat from charging or discharging, air for cooling flows through the space and contacts the battery module 10, which making it possible to prevent the battery module 10 from overheating. On the other hand, when the battery module 10 is excessively cold, air for heating flows through the space and contacts the battery module 10, which makes it possible to suppress a decrease in the temperature of the battery module 10. Adjusting the temperature of the battery module 10 makes it possible to inhibit a decrease in the input output characteristics of the battery module 10.

In FIG. 4, four protrusions 16 are arranged between two first ribs 15 that are adjacent in the Y-axis direction. These four protrusions 16 are lined up in the Z-axis direction. The number of protrusions 16 that are arranged between the two first ribs 15 that are adjacent in the Y-axis direction and the intervals of the protrusions 16 in the Z-axis direction may be set as appropriate according to various conditions, such as the property and flowrate of the fluid used as the heat carrier, and the size and shape of the flow path through which the heat carrier flows, for example. That is, in this example embodiment, four of the protrusions 16 are arranged at equally-spaced intervals in the Z-axis direction, but the example embodiment of the invention is not limited to this structure.

4. Structure of Heat-Transfer Efficiency Analysis Models

In order to analyze the effects of the arrangement of protrusions in the flow path for the heat carrier structured as described above on the heat-transfer efficiency, various analysis models where prepared that have three spaces (i.e., flow paths through which a heat carrier flows) divided by principal planes (that are parallel to the Y-Z plane) that face adjacent battery modules 10, and four first ribs 15 arranged between these principle planes, crossing these principal planes.

First, for an analysis model according to Example 1, on each of two opposing principal planes of each of the three flow paths, four protrusions 16 are arranged lined up at equally-spaced intervals in the Z-axis direction (i.e., the longitudinal direction of the flow paths) in the same positions on two opposing principal planes. That is, in the analysis model according to Example 1, four protrusions 16 are arranged at equally-spaced intervals on each opposing principal surface of the three flow paths (i.e., for a total of eight protrusions 16 in each flow path).

Figure 5A:
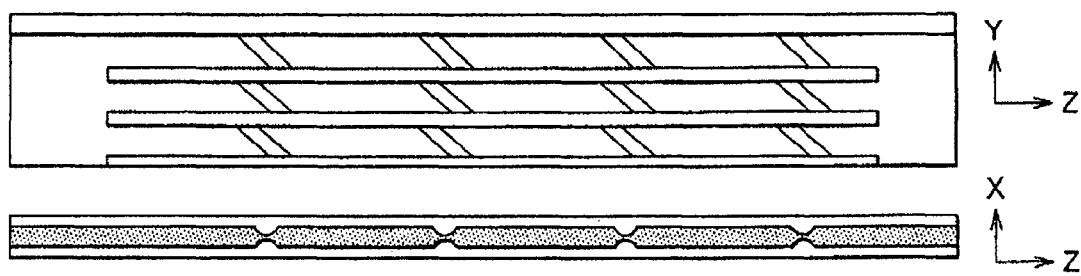
FIGS. 5A and 5B are views showing frame formats of the structures of models according to examples of the invention, for analyzing the effects of protrusions arranged in the heat carrier flow path of the battery pack on heat-transfer efficiency.

The individual protrusions 16 are each shaped like a circular column that has been divided into two by a plane that includes a line that connects the center of the top to the center of the bottom (i.e., a center line), and lowered onto the principal planes (i.e., the opposing surfaces) with the divided surface being the bottom surface. That is, the individual the protrusions 16 have a semi-cylindrical shape with the central axis as the longitudinal direction, and the cross-section according to a plane orthogonal to the longitudinal direction of the individual protrusions 16 has a semicircular shape. Also, the longitudinal direction of the individual protrusions 16 is inclined in the same direction with respect to the Z-axis direction (i.e., the longitudinal direction of the flow paths) (see the frame format view in FIG. 5A). Furthermore, both end portions in the longitudinal direction of the individual protrusions 16 are contacting the first ribs 15 that are arranged so as to cross the principal planes (i.e., the opposing surfaces) on which the protrusions 16 are arranged, and define the flow paths.

Figure 5B:
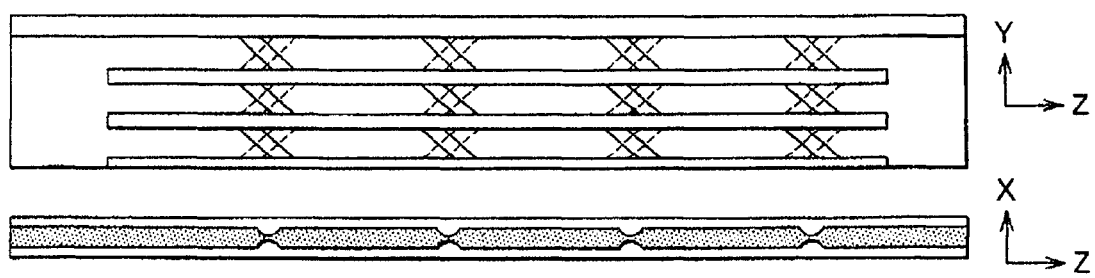

Next, for an analysis model according to Example 2, an analysis model similar to the analysis model according to Example 1, except for that the inclination with respect to the Z-axis direction (i.e., the longitudinal direction of the flow paths) of the longitudinal direction of the protrusions 16 that are arranged on one principal plane, of the four pairs of opposing protrusions 16 that are arranged on the principal planes that oppose each other of the three flow paths, and the inclination with respect to the Z-axis direction (i.e., the longitudinal direction of the flow paths) of the longitudinal direction of the protrusions 16 that are arranged on the other principal plane, of the four pairs of opposing protrusions 16 that are arranged on the principal planes that oppose each other of the three flow paths, are in opposite directions, was prepared (see the frame format view shown in FIG. 5B).

Figure 6A:
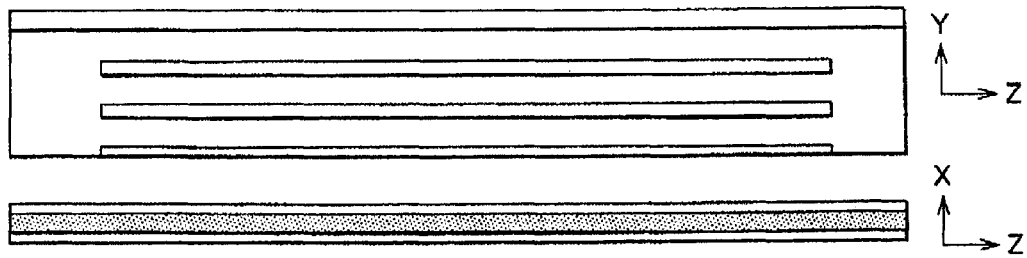
FIGS. 6A to 6C are views showing frame formats of the structures of models according to comparative examples, for analyzing the effects of protrusions arranged in the heat carrier flow path of the battery pack on heat-transfer efficiency.
Figure 6B:
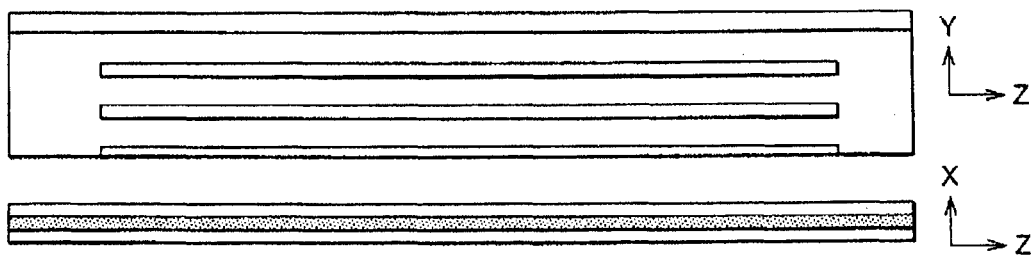

On the other hand, for an analysis model according to Comparative example 1, an analysis model similar to the analysis model according to Example 1, except for that no protrusions are arranged in the three flow paths, was prepared (see the frame format view shown in FIG. 6A). Also, for an analysis model according to Comparative example 2, an analysis model similar to the analysis model according to Comparative example 1, except for that the thickness of the members that form the opposing principal planes of each of the three flow paths is thicker than it is in the analysis model according to Comparative example 1, such that the intervals of the opposing principal planes of each of the three flow paths are narrower, and as a result the sectional area of the flow paths is smaller, was prepared (see the frame format view shown in FIG. 6B). That is, no protrusions are arranged in the three flow paths in the analysis model according to Comparative example 2 either.

Figure 6C:
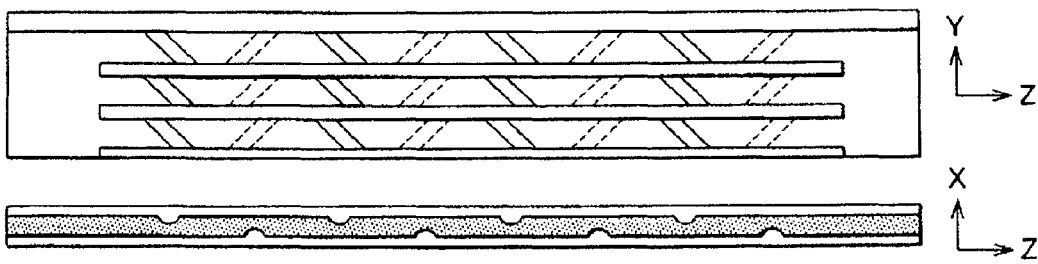

Moreover, for an analysis model according to Comparative example 3, an analysis model similar to the analysis model according to Example 2, except for that the positions in the Z-axis direction (i.e., the longitudinal direction of the flow paths), that is the longitudinal direction of the four protrusions 16 arranged on one principal plane, of the eight protrusions 16 that are arranged four on each of the principal planes that oppose each other of the three flow paths, and the positions in the Z-axis direction (i.e., the longitudinal direction of the flow paths), that is the longitudinal direction of the four protrusions 16 arranged on the other principal plane, of the eight protrusions 16 that are arranged four on each of the principal planes that oppose each other of the three flow paths, are offset in the Z-axis direction (i.e., the longitudinal direction of the flow paths), was prepared (see the frame format view shown in FIG. 6C).

The structures of the various analysis models according to Examples 1, 2 and Comparative examples 1 to 3 described above are summarized in Table 1 below.

TABLE 1

|  | Example 1 | Example 2 | Comparative example 1 | Comparative example 2 | Comparative example 3 |
| --- | --- | --- | --- | --- | --- |
| Protrusions | Present | Present | Absent | Absent | Present |
| Positions of protrusions on opposing surfaces | Same | Same | N/A | N/A | Different |
| Inclination of protrusions on opposing surfaces | Same direction | Opposite direction | N/A | N/A | Opposite direction |
| Interval of opposing surfaces | Standard | Standard | Standard | Narrow | Standard |

5. Evaluation of Heat-Transfer Efficiency Analysis Models

FIG. 6 is a graph showing the results from comparing the equivalent heat transfer coefficient that is the unit by which heat-transfer efficiency is measured, while variously changing the flowrate of the heat carrier for each of the various analysis models according to Examples 1, 2 and Comparative examples 1 to 3 structured as described above. As described above, FIG. 7 is a graph showing the relationship between the equivalent heat transfer coefficient and the flowrate of the heat carrier in the various analysis models according to Examples 1, 2 of the invention and Comparative examples 1 to 3. Here, the equivalent heat transfer coefficient is a value that is the unit by which heat-transfer efficiency is measured, and may be calculated according to Expression (1) below. Air was used as the heat carrier in Examples 1, 2 and Comparative examples 1 to 3.

$$E = \frac{Q}{S(T_w - T_m)} \quad (1)$$

$$T_m = \frac{T_{in} + T_{out}}{2}$$

In Expression (1) above, E represents the equivalent heat transfer coefficient (W/m²° C.), Q represents the heating value (W), S represents the heat transfer area (m²) from the heat source (that corresponds to the battery module) of the analysis model, $T_w$ represents the wall surface temperature (° C.) of the heat generating surface from the heat source (that corresponds to the battery module) of the analysis model, and $T_m$ represents the temperature (° C.) of the heat carrier. Also, $T_{in}$ and $T_{out}$ represent the temperature (° C.) of the heat carrier when the heat carrier flows into the analysis model and flows out of the analysis model, respectively.

Figure 8:
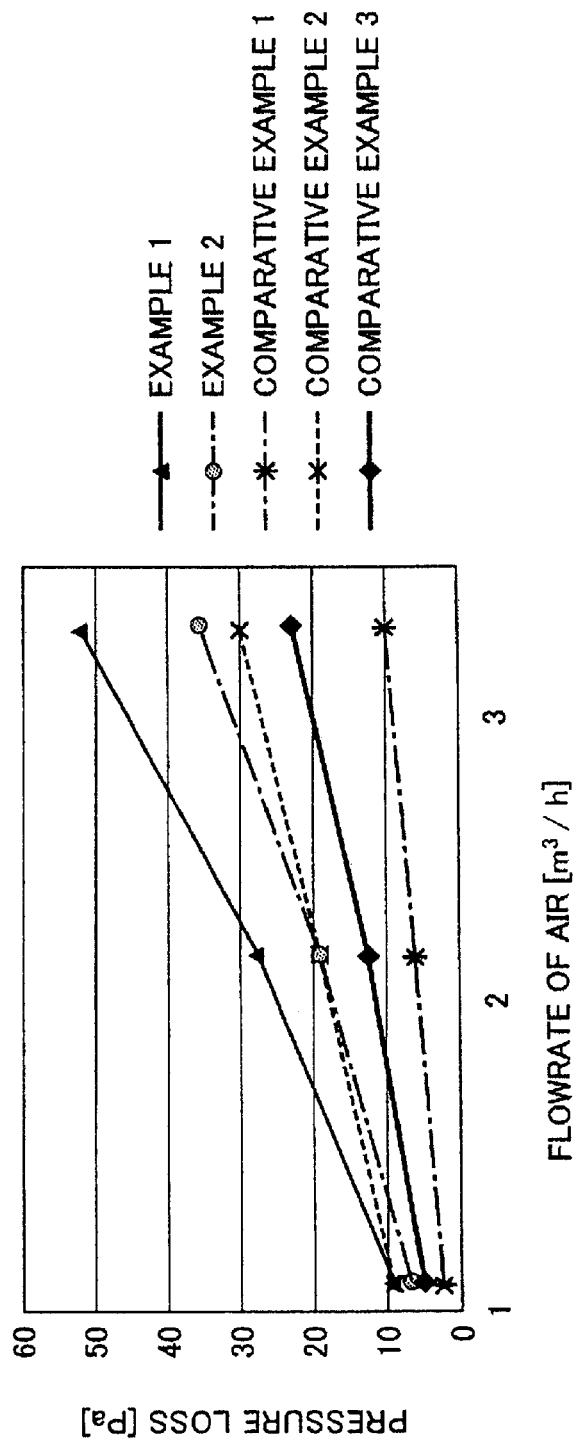
FIG. 8 is a graph showing the relationship between pressure loss and heat carrier flowrate in the various analysis models according to the example of the invention and the comparative examples.

Also, FIG. 8 is a view of the results from comparing the pressure loss before and after in each of the various analysis models, while variously changing the flowrate of the heat carrier for each of the various analysis models according to Examples 1, 2 and Comparative examples 1 to 3. As described above, FIG. 8 is a graph showing the relationship between the pressure loss and the flowrate of the heat carrier in the various analysis models according to Examples 1, 2 of the invention and Comparative examples 1 to 3.

Figure 7:
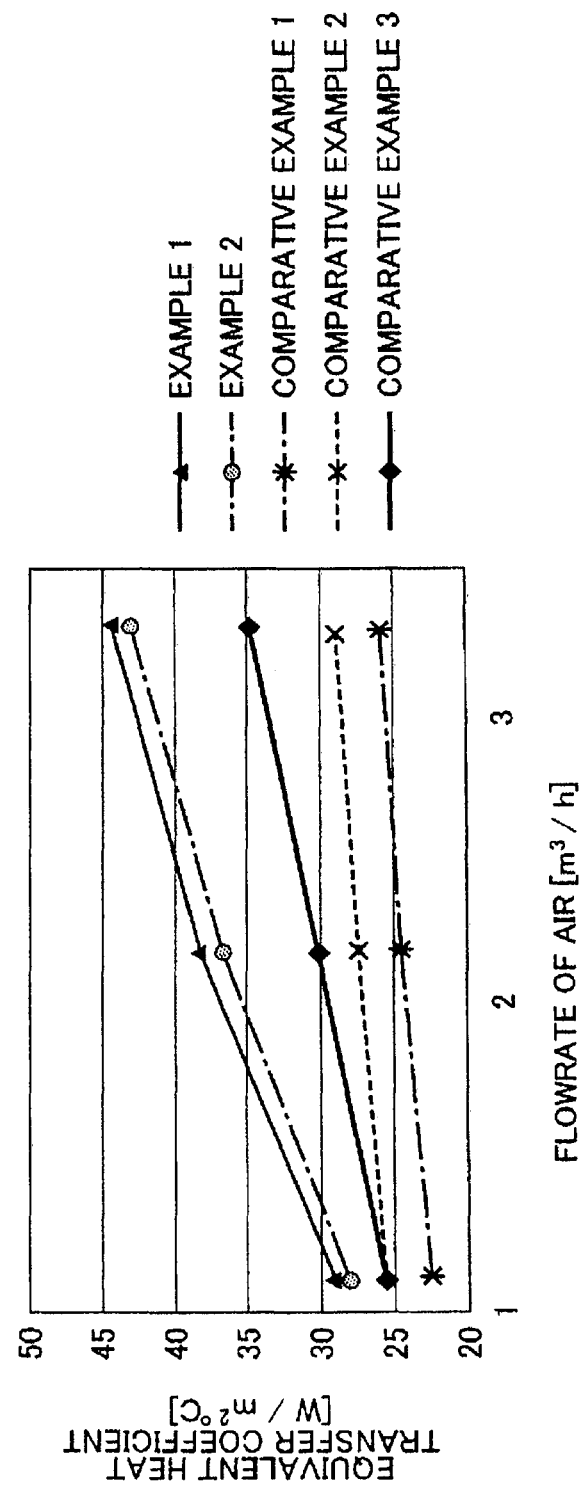
FIG. 7 is a graph showing the relationship between equivalent heat transfer coefficient and heat carrier flowrate in the various analysis models according to the example of the invention and the comparative examples.

As shown in FIG. 7, when compared with the analysis model according to Comparative example 1 in which there are no protrusions arranged in the three flow paths, in the analysis model according to Comparative example 2 that is a model in which the flow paths in the analysis model according to Comparative example 1 have been made narrower, the equivalent heat transfer coefficient is slightly increased. This is thought to be because the flowrate of the heat carrier (i.e., air) inside the flow paths is increased due to the flow paths being narrower in the analysis model according to Comparative example 2. Also, because the flow paths in the analysis model according to Comparative example 2 are narrower, the pressure loss is greatly increased compared with the analysis model according to the Comparative example 1, as shown in FIG. 8.

Figure 10A:
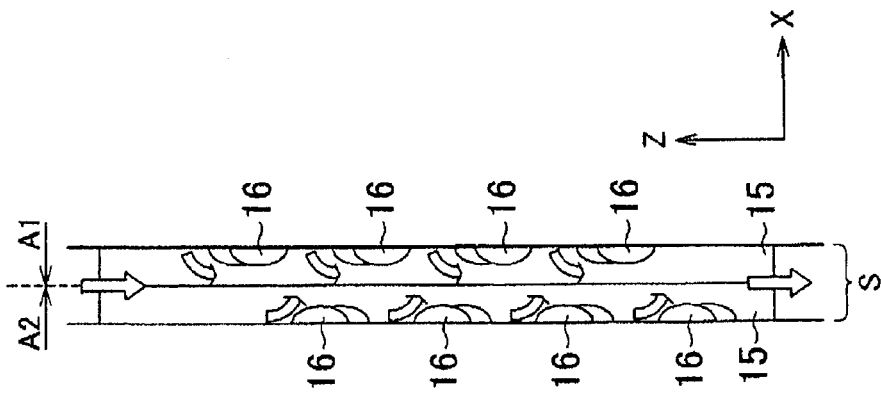
FIGS. 10A and 10B are views showing frame formats of the flow of heat carrier inside the flow path in the analysis models according to the examples of the invention.

Next, in the analysis model according to Comparative example 3 in which the inclination of the longitudinal direction of the protrusions arranged on one surface of the opposing surfaces is in the opposite direction of the inclination of the longitudinal direction of the protrusions arranged on the other opposing surface, just as with the analysis model according to Example 2, but the positions of the protrusions arranged on one surface of opposing surfaces in the flow paths are different (i.e., are offset (i.e., are different in the Z-axis direction (i.e., the longitudinal direction of the flow paths)) from the positions of the protrusions arranged on the other surface of opposing surfaces in the flow paths, the equivalent heat transfer coefficient is increased even more than it is in the analysis model according to Comparative example 2, as shown in FIG. 7. This is thought to be because, in contrast to when protrusions are not arranged in the flow paths for the heat carrier in the analysis models according to Comparative examples 1 and 2, in the analysis according to Comparative example 3, protrusions having an inclination in the opposite direction are arranged in different positions on the opposing surfaces, as shown in FIG. 10C, which causes the flow of the heat carrier to twist, as shown by the arrows in FIG. 10C, and as a result, disturbance in the flow of the heat carrier increases, thereby improving the heat-transfer efficiency between the heat carrier and the wall surfaces of the flow paths. Also, in the analysis model according to Comparative example 3 having this structure, the amount of increase in pressure loss when compared with the analysis model according to Comparative example 1 is less than it is with the analysis model according to Comparative example 2 in which the heat carrier flow paths themselves are narrower, as shown in FIG. 8.

On the other hand, as described above, the analysis models according to Examples 1 and 2, in which the positions of the protrusions arranged on one surface of the opposing surfaces in the flow paths match (i.e., are not offset in the Z-axis direction (i.e., the longitudinal direction of the flow paths) from) the positions of the protrusions arranged on the other surface of the opposing surfaces in the flow paths, displayed an extremely high equivalent heat transfer coefficient, as shown in FIG. 7. This is thought to be because in these analysis models the positions of the protrusions that are arranged on one surface of the opposing surfaces in the flow path match the positions of the protrusions that are arranged on the other surface of the opposing surfaces in the flow path, so in the flow paths for the heat carrier, the sectional area of the flow paths at locations where the protrusions are present is small, so the flowrate of the heat carrier increases, but at other locations, the flowrate of the heat carrier does not increase, and as a result, the disturbance in the flow of the heat carrier becomes even greater, so the heat-transfer efficiency between the heat carrier and the wall surfaces of the flow paths is significantly improved.

Also, in the analysis models according to Examples 1 and 2, pressure loss is greater than it is in any of the analysis models according to Comparative examples 1 to 3, as shown in FIG. 8. In addition, the amount of increase in the pressure loss is significantly greater in the analysis model according to Example 1 than it is in the analysis model according to Example 2. This is thought to be because in the analysis model according to Example 1, in addition to the positions of the protrusions arranged on one surface of the opposing surfaces in the flow paths matching the positions of the protrusions arranged on the other surface of the opposing surfaces in the flow paths, the inclination of the longitudinal direction of the protrusions is in the same direction on one surface as it is on the other surface, so as shown in FIG. 10A, in locations where the protrusions are present, the region where the sectional area of the flow path is small is larger, and the heat carrier is led in the same direction on both sides of the opposing surfaces, along the protrusions that are inclined in the same direction, and as a result, the heat carrier flow resistance becomes even larger.

Figure 10B:
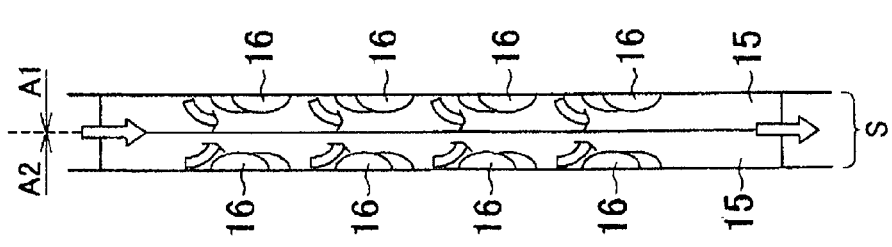
Figure 10C:
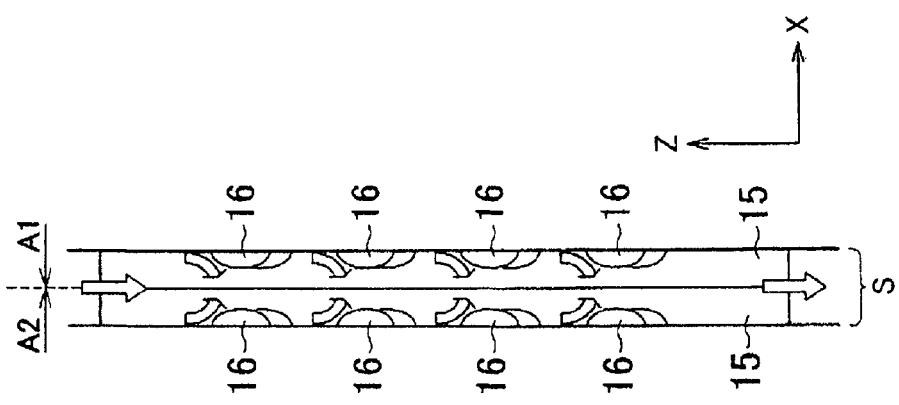
FIG. 10C is a view showing a frame format of the flow of heat carrier inside the flow path in the analysis model according to the comparative example.

In contrast to this, in the analysis model according to Example 2 in which the inclination of the longitudinal direction of the protrusions arranged on one surface of the opposing surfaces in the flow paths of the heat carrier is in the opposite direction of the inclination of the longitudinal direction of the protrusions arranged on the other surface of the opposing surfaces in the flow paths of the heat carrier, as shown in FIG. 10B, at locations where the protrusions are present, the longitudinal directions of the protrusions cross (i.e., do not match), so the region where the sectional area of the flow paths is small is smaller than it is in the analysis model according to Example 1, and the inclinations of the longitudinal direction of the protrusions are in opposite directions. As a result, the heat carrier is led in opposite directions on both sides of the opposing surfaces, so the heat carrier flow resistance did not become as large as it did in the analysis model according to Example 1.

It was confirmed that an extremely high equivalent heat transfer coefficient can be achieved by making the positions of the protrusions that are arranged on one surface of the opposing surfaces in the flow path match (i.e., not offset in the Z-axis direction (i.e., the longitudinal direction of the flow paths) from) the positions of the protrusions that are arranged on the other surface of the opposing surfaces in the flow path, as described above, even compared with when the positions of the protrusions that are arranged on one surface of the opposing surfaces in the flow path are offset with respect to the positions of the protrusions that are arranged on the other surface of the opposing surfaces in the flow path. It was also confirmed that, in a structure in which the positions of the protrusions that are arranged on one surface of the opposing surfaces in the flow path match the positions of the protrusions that are arranged on the other surface of the opposing surfaces in the flow path, a substantially equivalent heat transfer coefficient can be achieved at a lower pressure loss by inclining the longitudinal direction of the protrusions that are arranged on one surface of the opposing surfaces in the flow path in the opposite direction of the longitudinal direction of the protrusions that are arranged on other surface of the opposing surfaces in the flow path, compared with when the longitudinal direction of the protrusions that are arranged on one surface of the opposing surfaces in the flow paths is inclined in the same direction as the longitudinal direction of the protrusions that are arranged on the other surface of the opposing surfaces in the flow paths.

As described above, it was discovered that the positions of the protrusions arranged on opposing surfaces in the flow paths for the heat carrier and the inclination of the longitudinal direction of the protrusions affect the equivalent heat transfer coefficient and the pressure loss, respectively. Therefore, the graph in FIG. 9 was prepared to obtain the relationship between the equivalent heat transfer coefficient and the pressure loss measured at various flowrates of the heat carrier for each of the various analysis models according to Examples 1 and 2 and Comparative examples 1 to 3 structured as described above. That is, FIG. 9 is a graph showing the relationship between the equivalent heat transfer coefficient and the pressure loss in the various analysis models according to the examples of the invention and the comparative examples, as described above.

Figure 9:
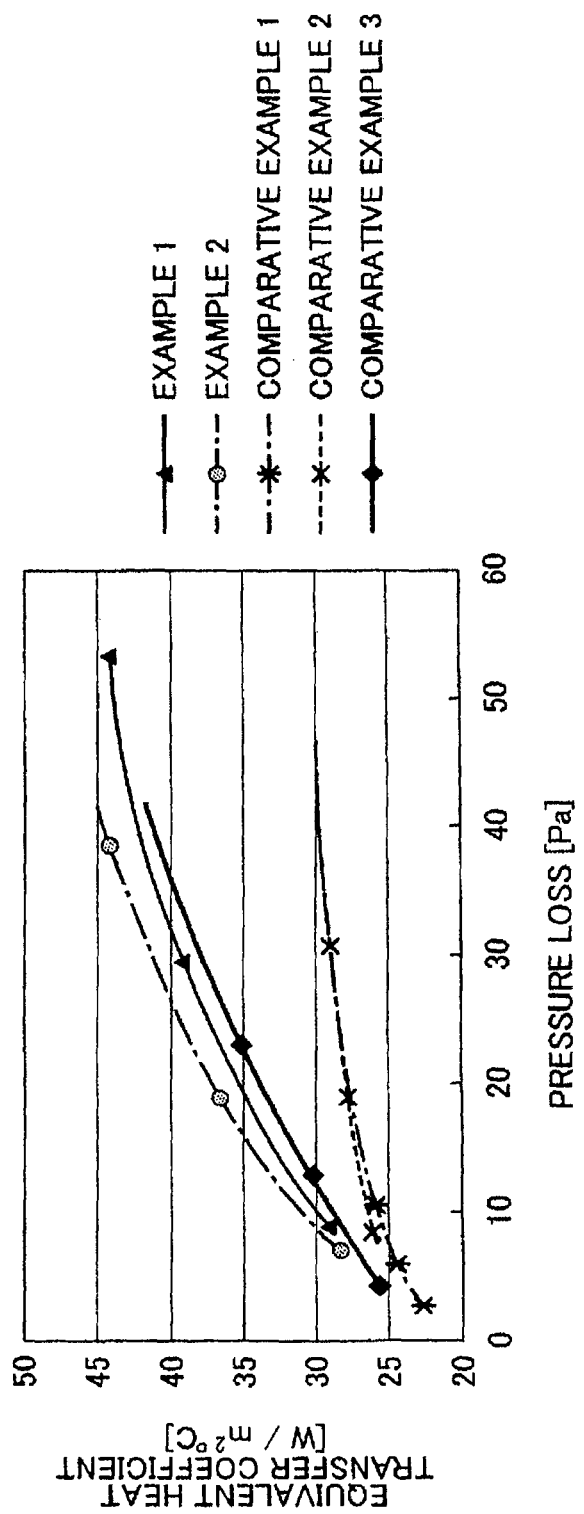
FIG. 9 is a graph showing the relationship between equivalent heat transfer coefficient and pressure loss in the various analysis models according to the example of the invention and the comparative examples.

As shown in FIG. 9, it is evident that an even greater equivalent heat transfer coefficient is achieved in the analysis models according to Examples 1 and 2 in which the positions of the protrusions arranged on one surface of the opposing surfaces of the flow paths match (i.e., are not offset in the Z-axis direction (i.e., the longitudinal direction of the flow paths) from) the positions of the protrusions arranged on the other surface of the opposing surfaces of the flow paths, compared not only with the analysis models according to Comparative examples 1 and 2 in which protrusions are not arranged in the flow paths, but also with the analysis model according to Comparative example 3 in which the inclination of the longitudinal direction of the protrusions that are arranged on one surface of the opposing surfaces of the flow paths is in the opposite direction of the inclination of the longitudinal direction of the protrusions that are arranged on the other surface of the opposing surfaces of the flow paths, and the positions of the protrusions on one surface are different (i.e., are offset in the Z-axis direction (i.e., the longitudinal direction of the flow paths)) than they are on the other surface.

In particular, in the analysis model according to Example 2 in which, in addition to the positions of the protrusions arranged on one surface of the opposing surfaces in the flow paths matching the positions of the protrusions arranged on the other surface of the opposing surfaces in the flow paths, the inclination of the longitudinal direction of the protrusions is in the opposite direction on one surface than it is on the other surface, it was confirmed that it is possible to achieve a high equivalent heat transfer coefficient at a lower pressure loss compared with the analysis model according to Example 1 in which the inclination of the longitudinal direction of the protrusions is in the same direction on one surface as it is on the other surface.

As is evident from the examples described above, in a battery pack that includes a plurality of battery modules, at least one space that is formed between the battery modules that are adjacent to each other, and that serves as a flow path through which a heat carrier flows, and a plurality of protrusions that protrude toward an inside of the space, and that are arranged on surfaces of opposing surfaces that oppose each other and that define the space, a higher heat-transfer efficiency (i.e., equivalent heat transfer coefficient) can be achieved, such that the temperature of the battery modules can be regulated more efficiently, by arranging the plurality of protrusions arranged on one surface of the opposing surfaces and the plurality of protrusions arranged on the other surface of the opposing surfaces in positions that oppose each other across the space.

Also, in this batter pack described above, a higher heat-transfer efficiency (i.e., equivalent heat transfer coefficient) is able to be achieved, and thus the temperature of the battery modules is able to be regulated more efficiently, as a result of the protrusions having a longitudinal direction when viewed from the protruding direction of the protrusions, and the longitudinal direction of the protrusions being inclined with respect to a flow direction of the heat carrier in the space, that is a flow direction that excludes disturbed flow caused by the presence of the protrusions.

Moreover, in the battery pack described above, a high heat-transfer efficiency (i.e., (i.e., equivalent heat transfer coefficient) is able to be achieved at a lower pressure loss with a structure in which the longitudinal direction of the plurality of protrusions that are arranged on one surface of the opposing surfaces is inclined, with respect to the flow direction of the heat carrier, in the opposite direction of the longitudinal direction of the plurality of protrusions that are arranged on the other surface of the opposing surfaces, compared with a structure in which the longitudinal direction of the plurality of protrusions that are arranged on one surface of the opposing surfaces is inclined, with respect to the flow direction of the heat carrier, in the same direction as the longitudinal direction of the plurality of protrusions that are arranged on the other surface of the opposing surfaces.

The invention claimed is:

1. A battery pack comprising:
   a plurality of battery modules;
   at least one space that is formed between the battery modules that are adjacent to each other, and that serves as a flow path through which a heat carrier flows; and
   a plurality of protrusions that protrude toward an inside of the space, and that are arranged on surfaces of opposing surfaces that oppose each other and that define the space,
   wherein the plurality of protrusions that are arranged on one surface of the opposing surfaces and the plurality of protrusions that are arranged on the other surface of the opposing surfaces are arranged in positions that oppose each other across the space,
   wherein the protrusions have a longitudinal direction when viewed from a protruding direction of the protrusions,
   wherein the longitudinal direction of the protrusions is inclined with respect to a flow direction of the heat carrier in the space, that is a flow direction that excludes disturbed flow caused by the presence of the protrusions, and
   wherein the longitudinal direction of the plurality of protrusions that are arranged on one surface of the opposing surfaces is inclined with respect to the flow direction of the heat carrier in an inverse manner in relation to a direction in which the longitudinal direction of the plurality of protrusions that are arranged on the other surface of the opposing surfaces is inclined with respect to the flow direction of the heat carrier.

2. The battery pack according to claim 1, wherein the space is divided into a plurality of regions by a dividing member that is arranged between the battery modules that are adjacent to each other.

3. The battery pack according to claim 2, wherein the protrusions have a longitudinal direction when viewed from the protruding direction of the protrusions; and at least one end portion in the longitudinal direction of the protrusions is in contact with the dividing member.

4. The battery pack according to claim 2, wherein the dividing member is a rib that protrudes toward the inside of the space, and that is arranged on at least one surface of the opposing surfaces.

* * * * *